United States Patent [19]

Liston et al.

[11] Patent Number: 5,259,724
[45] Date of Patent: Nov. 9, 1993

[54] INLET FAN BLADE FRAGMENT CONTAINMENT SHIELD

[75] Inventors: Laurence D. N. Liston, Mason; Michael J. Sepela, Middletown, both of Ohio

[73] Assignee: General Electric Company, Cincinnati, Ohio

[21] Appl. No.: 878,705

[22] Filed: May 1, 1992

[51] Int. Cl.$^5$ .............................................. F01D 21/00
[52] U.S. Cl. ........................................ 415/9; 415/119
[58] Field of Search ................ 415/9, 121.2, 119, 200

[56] References Cited

U.S. PATENT DOCUMENTS

| | | |
|---|---|---|
| 1,698,514 | 1/1929 | Schmidt . |
| 3,542,152 | 11/1970 | Adamson et al. ............... 415/119 |
| 3,974,313 | 8/1976 | James ............................. 415/9 |
| 4,377,370 | 3/1983 | Porcelli .......................... 415/9 |
| 4,397,608 | 8/1983 | Husain et al. .................. 415/9 |
| 4,417,848 | 11/1983 | Dembeck . |
| 4,425,080 | 1/1984 | Stanton et al. . |
| 4,452,335 | 6/1984 | Mathews et al. . |
| 4,475,864 | 10/1984 | Patacca et al. ................. 415/9 |
| 4,534,698 | 8/1985 | Tomich . |
| 4,547,122 | 10/1985 | Leech .............................. 415/9 |
| 4,598,449 | 7/1986 | Monhardt et al. . |
| 4,648,795 | 3/1987 | Lardellier ...................... 415/9 |
| 4,732,532 | 3/1988 | Schwaller et al. ............. 415/119 |
| 4,878,821 | 11/1989 | Huether et al. ................ 415/9 |

FOREIGN PATENT DOCUMENTS 2065766  7/1981  United Kingdom ............... 415/119

Primary Examiner—Edward K. Look
Assistant Examiner—James A. Larson
Attorney, Agent, or Firm—Jerome C. Squillaro; John R. Rafter

[57] ABSTRACT

A blade containment system for fan blades of a gas turbine engine includes a fan casing surrounding the fan blades and serving as a first blade containment structure and a second blade containment structure positioned axially forward of the fan casing within an engine nacelle. The second containment structure preferably includes an inner liner of noise absorbing material, such as honeycomb paneling. Preferably, the second containment structure comprises a ring of titanium material having axially oriented stiffeners for controlling bending upon impact by a broken blade or blade fragment. The stiffeners are desirably integrally formed in the ring and the ring is illustratively produced by super plastic forming. The ring may be formed as a plurality of arcuate segments having edges adapted for joining with adjacent segments to form a complete ring. A flange may be attached to an aft edge of the ring and used to connect the ring to the fan casing. A forward edge of the ring may have an integrally formed flange for attaching the ring to a support member within the nacelle. The position of the second blade containment structure is such that blades or blade fragments ejected forward of a blade rotation path are captured by the ring and honeycomb liner thus preventing axial projection of the blade fragments out of the nacelle.

10 Claims, 3 Drawing Sheets

INLET FAN BLADE FRAGMENT CONTAINMENT SHIELD

BACKGROUND OF THE INVENTION

The present invention relates to aircraft gas turbine engines and, more particularly, to a fan blade containment structure for containing blade fragments ejected from damaged fan blades.

Gas turbine engines used in commercial aircraft are conventionally of a fan jet construction, i.e., the engines have a high volume fan at an axially forward end for forcing air into a first flow passage through an axial compressor, combustor and turbine and into a second bypass flow passage for providing thrust. The fan is positioned within a nacelle surrounding and spaced from a core engine housing containing the compressor, combustor and turbine, the space between the nacelle structure and core engine housing defining the bypass flow passage. During operation of the engine, and in particular during movement of an aircraft powered by the engine, the fan blades may be damaged by foreign objects such as, for example, birds or debris picked up on a runway. Impacts on the blades may damage the blades and result in blade fragments or entire blades being dislodged and flying radially outward at relatively high velocity.

Typically, fan jet engines have a fan casing circumscribing the engine within the nacelle and a blade containment structure circumscribing the fan casing. The casing may include a radial inner liner of noise absorption material, such as honeycomb panels, for reducing noise generated by the engine. One form of blade containment structure is described in U.S. Pat. No. 4,534,698 issued Aug. 13, 1985 and assigned to the assignee of the present invention, the disclosure of such patent being hereby incorporated by reference.

While the containment structure of the aforementioned U.S. patent has been effective in particular engines to provide the necessary containment of blade fragments, the recent development of larger engines with higher bypass ratios has revealed blade failure modes different than those of prior engines. In particular, in engines having relatively shorter axial fan casing dimensions, fan blade fragments have been found to be thrown radially outward and axially forward of the fan casing striking the inlet area at greater velocity than previously experienced. The resulting high energy impacts on the inlet inner liner may be sufficiently large to cause collapse of the acoustic honeycomb liner by compression of the honeycomb cell structure. Blade fragments may then exit tangentially through the inlet and, if the aircraft is in flight, perhaps result in damage to the aircraft. Accordingly, there is a need for a blade containment structure which can contain blade fragments ejected forward of a fan casing.

SUMMARY OF THE INVENTION

A blade containment system for fan blades of a gas turbine engine includes a fan casing surrounding the fan blades and serving as a first blade containment structure and a second blade containment structure positioned axially forward of the fan casing within an engine nacelle. The second containment structure preferably includes an inner liner of noise absorbing material, such as honeycomb paneling. Preferably, the second containment structure comprises a ring of titanium material having axially oriented stiffeners for controlling bending upon impact by a broken blade or blade fragment and resisting high bending loads caused by rotating fan unbalance. The stiffeners are desirably integrally formed in the ring and the ring is illustratively produced by super plastic forming. The ring may be formed as a plurality of arcuate segments having edges adapted for joining with adjacent segments to form a complete ring. A flange may be attached to an aft edge of the ring and used to connect the ring to the fan casing. A forward edge of the ring may have an integrally formed flange for attaching the ring to a support member within the nacelle. The position of the second blade containment structure is such that blades or blade fragments ejected forward of a blade rotation path are captured by the ring and honeycomb liner thus preventing axial projection of the blade fragments out of the nacelle.

BRIEF DESCRIPTION OF THE DRAWINGS

For a better understanding of the present invention, reference may be had to the following detailed description taken in conjunction with the accompanying drawings in which.

DETAILED DESCRIPTION

Figure 1:
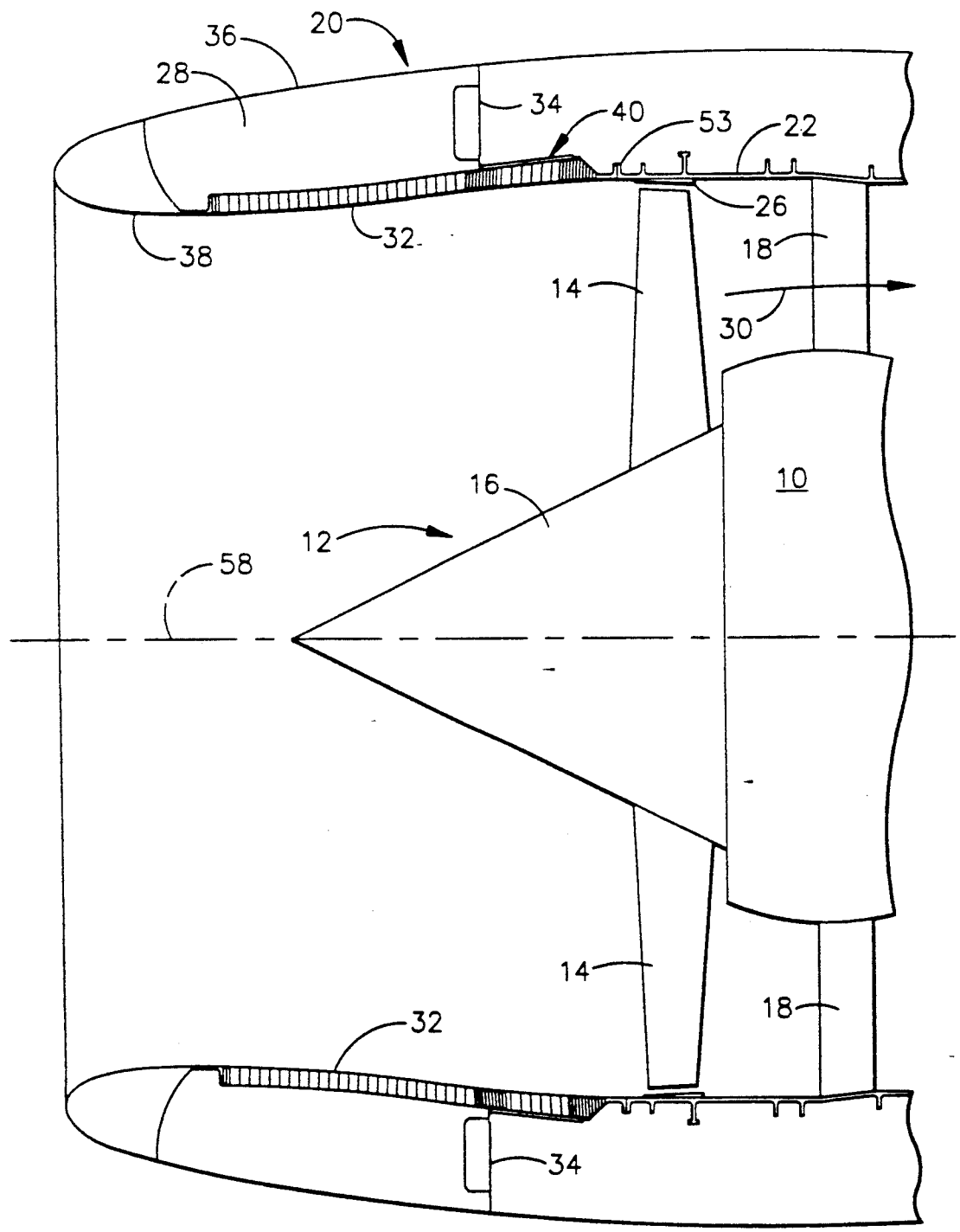
FIG. 1 is a simplified partial cross-sectional view of an inlet area of a gas turbine engine nacelle incorporating the present invention.

Turning now to the FIGS. in general and in particular to FIG. 1, there is shown a simplified cross-sectional view of an inlet area of a gas turbine engine which incorporates the present invention. The inlet area includes a forward end of a core engine casing 10 which contains a compressor, combustor and turbine arranged for driving a fan blade assembly 12 comprising fan blades 14 and nose cone or spinner 16. While only two blades 14 are shown, it will be appreciated that many blades are typically connected to blade assembly 12. Surrounding the blade assembly 12 and supported from the casing 10 by inlet guide vanes 18 is a fan casing 22. The fan casing 22 is positioned within an aerodynamic nacelle 20 and extends axially from a forward point about 9.5 degrees forward of a stacking axis (not shown) of blades 14 to a point aft of inlet guide vanes 18. The casing 22 is a steel structure which acts as a first containment structure encircling fan blades 14. A rub strip 26 is attached to casing 22 adjacent the tips of blades 14.

The inlet 28 of nacelle 20 extends forward of fan assembly 12 and serves to guide inlet air into the fan blades 14. Part of this air passes into engine casing 10 where it is compressed, mixed with fuel and ignited in a combustor and then used to drive a turbine which drives fan blades 14. A larger portion of the inlet air bypasses the core engine through the path indicated by arrows 30 and provides primary thrust output of the engine.

Additional acoustic honeycomb structure 32 forms an inner surface of the inlet 28 of nacelle 20 axially forward of fan casing 22. The structure 32 is of an acoustic type having structural characteristics with a radially inner and radially outer skin of synthetic material, such as a fiber material in an epoxy resin base, or a metal, such as aluminum. Within the inlet 28 there are annular bulkheads, such as bulkhead 34, which provide structural support for the inlet 28. The forward portion of the inlet 28 comprises an inlet lip 38 which is supported by the connections between the fan casing 22, the inlet acoustic structure 32 and an outer skin or wall 36 of aluminum, or a composite material or other suitable material.

In FIG. 1, it can be seen that the fan casing 22 extends only slightly forward of the fan blades 14. Applicants have found that in some instances, during separation of one of the blades 14, that the separated blade may follow a spiral path moving axially forward of the fan casing 22 or may move radially outward striking the rub strip 26 and then be directed axially forward into structure 32. In such event, the blade 14 may strike the honeycomb structure 32 with sufficient force to puncture through the structure 32 and outer cowl or wall 36 of nacelle 20. In general, it is believed that the impact area is within a few inches of the forward edge of fan casing 22. In order to minimize the opportunity for a separated blade or blade fragment to be ejected from the engine through the forward portion of nacelle 20, the present invention incorporates a second blade containment structure 40 encircling at least a portion of honeycomb structure 32 forward of fan casing 22. The axially forward edge of structure 40 is attached to bulkhead 34 and the axially aft edge is attached to fan casing 22. The structure 40 overlays a radially outer surface or skin of honeycomb structure 32 between bulkhead 34 and casing 22.

Figure 2:
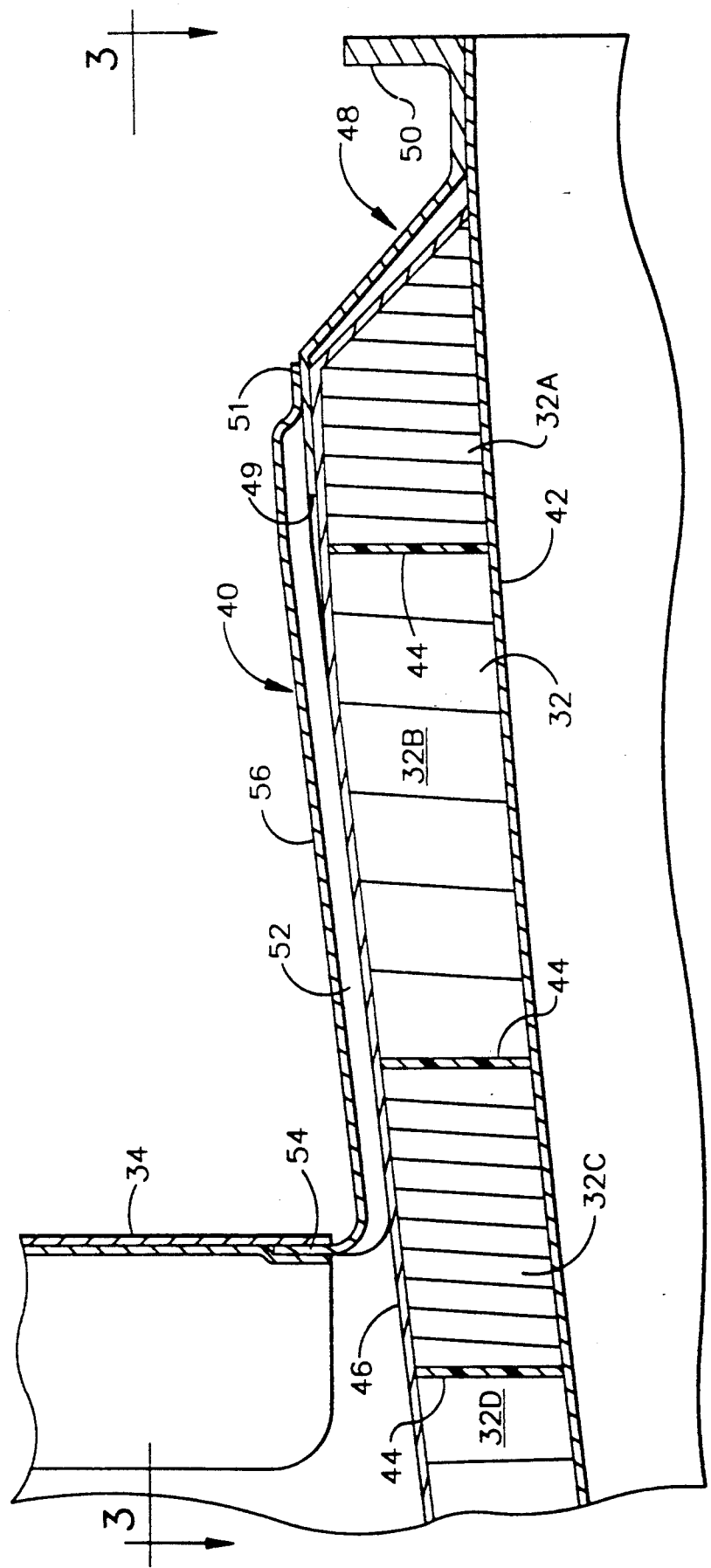
FIG. 2 is a enlarged view of a portion of FIG. 1 showing details of the present invention.

Referring to FIG. 2, there is shown an enlarged cross-sectional view of containment structure 40 and the adjacent honeycomb structure 32. The honeycomb structure 32 includes an annular inner wall 42 of aluminum or other suitable material having a relatively smooth surface which defines the radially outer boundary of the air flowpath through the nacelle 20. In the illustrative form, the honeycomb structure has a high density honeycomb at 32A, a low denisty honeycomb at 32B, a high density at 32C and low density at 32D. The small size areas provide additional rigidity at bulkhead 34 and at the end area adjacent casing 22. Adhesive joints between segments are indicated at 44. An outer annular skin or wall 46 circumscribes the honeycomb structure 32.

Containment structure 40 includes an axially aft attachment member 48 having a radially outward extending flange 50 for connection to a mating flange (53) (See FIG. 1) on fan casing 22. The member 48 is an annular ring which may be formed in arcuate segments, and extends generally parallel to an adjacent surface of wall 46 of honeycomb structure 32, terminating after a relatively small amount of overlap of honeycomb segment 32A at point 49.

Figure 4:
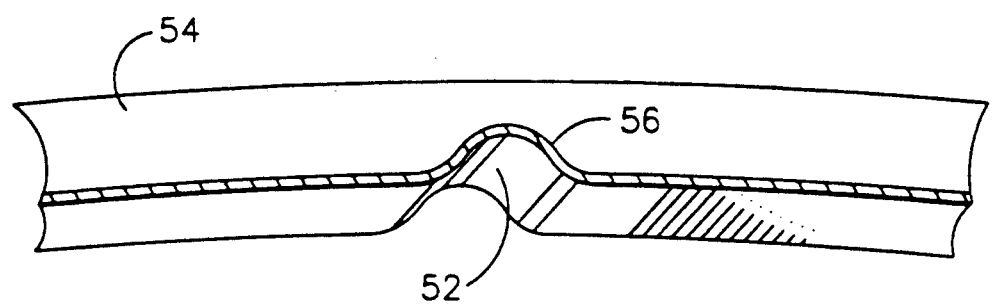
FIG. 4 is a view taken along line 4—4 of FIG. 3.

The remaining portion of containment structure 40 extends from an overlap of flange member 48 at 51 to bulkhead 34 and comprises an annular ring 52 having a radially outward extending integral flange 54. The cross-sectional view of FIG. 2 is taken through a generally axially extending stiffener 56 formed integrally with ring 52. Referring briefly to FIG. 4, the stiffener 56 can be seen to be a rib or deformation formed in the ring 52 and provides axial stiffness to the ring. As shown in FIG. 2, the ring 52 fits generally snugly about honeycomb structure 32 and is fastened to structure 32 by bolts or other types of fasteners. The forward flange 54 may be riveted, bolted or otherwise attached to bulkhead 34.

Figure 3:
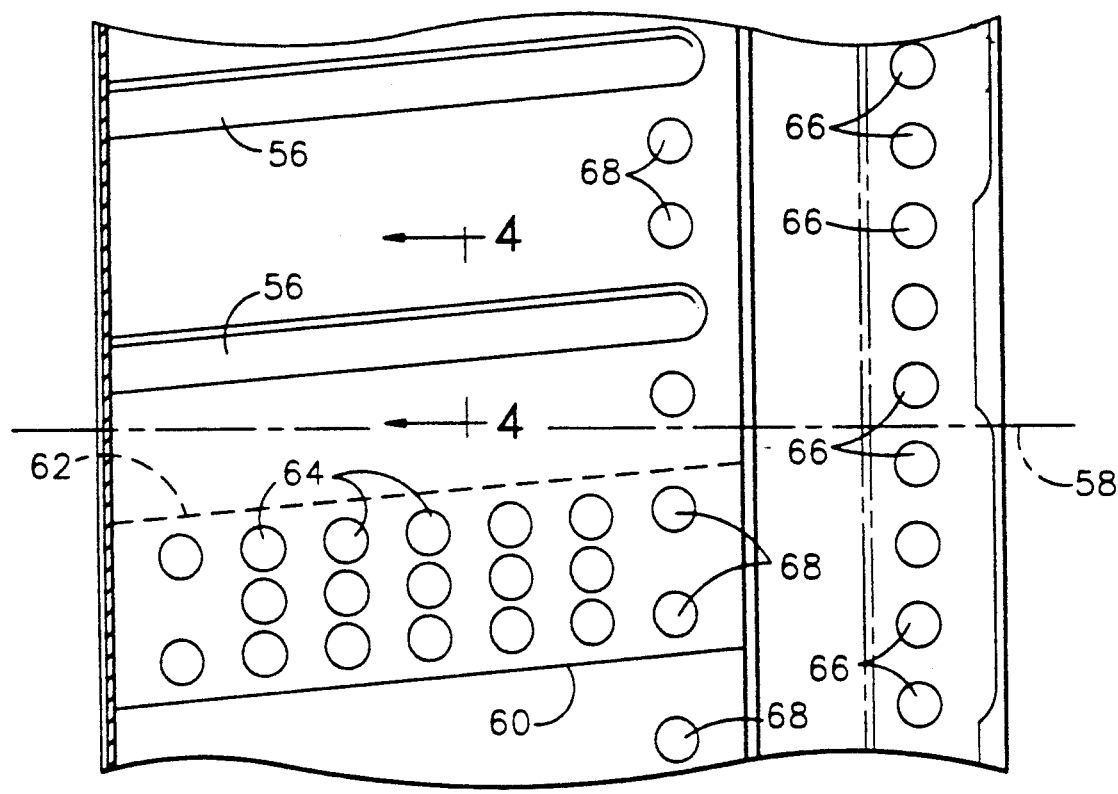
FIG. 3 is a view taken along the line 3—3 of FIG. 2.

FIG. 3 is a view taken along line 3—3 of FIG. 2 and illustrates the angular orientation of stiffeners 56 with respect to an engine axis 58 (See also FIG. 1). The line 60 and phantom line 62 indicate an overlapping joint between adjacent arcuate segments forming ring 52. Circles 64 indicate rivets or other fasteners used to join adjacent segments. The fasteners indicated at 66 and at 68 are used to attach the ring 52 and member 48 to the underlying honeycomb structure 32. The fasteners at 66 also attach ring 52 to member 48.

In a preferred embodiment, the ring 52 is produced from six arcuate segments of super plastic formed titanium with integrally shaped, beaded stiffeners 56. The ring 52 is nominally 0.063 inches thick. The stiffeners 56 extend axially to provide greater bending stiffness. Titanium is more weight efficient than steel for the same strength and its use minimizes additional engine weight. Super plastic forming of titanium is easier than machining a steel casing.

While the invention has been described in what is considered to be a preferred embodiment, other modifications will become apparent to those of ordinary skill in the art. It is intended, therefore, that the invention be interpreted within the full spirit and scope of the appended claims.

What is claimed is:

1. A blade containment system for fan blades of a gas turbine engine comprising:

a fan casing spaced radially outward and surrounding the fan blades;

a first blade containment structure comprising said fan casing for containing blade fragments projected radially outward of the fan blades; and a second blade containment structure positioned axially forward of said fan casing and encircling the engine for capturing blade fragments projected radially outward and axially forward of the fan blades;

wherein said second blade containment structure comprises an outer ring of super-plastic formed titanium having integrally formed axial stiffeners, wherein each of said axial stiffeners includes an arcuate cross-section, wherein said axial stiffeners increase a bending stiffness of said blade containment system.

2. The blade containment system of claim 1 wherein said second blade containment structure includes an inner liner of noise absorbing material, wherein said outer ring is rigidly attached to said inner liner with a fastening means, wherein said outer ring fits generally snugly about said inner liner.

3. The blade containment system of claim 2 wherein said inner liner comprises a honeycomb structure having an axially varying density, said honeycomb structure having a relatively high density in a first region adjacent said fan casing and in a second region radially inward of and axially aligned with a radially outward extending flange coupled to an axially forward edge of said outer ring for enhancing a structural rigidity of said second blade containment structure.

4. The blade containment system of claim 3 wherein said axial stiffeners each comprise a radial deformation of said outer ring.

5. A blade containment system for fan blades of a gas turbine engine comprising:

a fan casing spaced radially outward and surrounding the fan blades;

a first blade containment structure comprising said fan casing for containing blade fragments projected radially outward of the fan blades; and a second blade containment structure positioned axially forward of said fan casing and encircling the engine for capturing blade fragments projected radially outward and axially forward of the fan blades;

wherein said second blade containment structure includes an inner liner of noise absorbing material;

wherein said second blade containment structure comprises an outer ring of titanium having integrally formed axial stiffeners;

wherein said axial stiffeners each comprise a radial deformation of said outer ring; and wherein said outer ring comprises a plurality of arcuate sections, each section having a first circumferential end overlapping a second circumferential end of an adjacent section for forming a lap joint.

6. A blade containment structure for capturing blade fragments ejected from a rotating fan blade assembly in a gas turbine engine, the engine having a nacelle with an inlet for directing air into the fan blade assembly, the blade containment structure comprising:

an outer ring encircling the engine axially forward of the fan blade assembly and axially aft of an engine inlet lip, wherein said outer ring includes a plurality of circumferentially spaced and integrally formed axial stiffeners, each of said stiffeners having an arcuate cross-section, wherein said axial stiffeners increase a bending stiffness of said blade containment structure.

7. The blade containment structure of claim 6, further comprising:

a noise absorption liner and a fastening means for fixedly attaching said liner to an inner surface of said outer ring, wherein said outer ring fits generally snugly about said liner;

wherein the engine includes a fan casing coupled to the nacelle and circumscribing the fan blade assembly, said outer ring being coupled between the engine inlet lip and an axially forward edge of the fan casing;

wherein said liner comprises a honeycomb structure having an axially varying density.

8. The blade containment structure of claim 7 and including a first radially outward extending flange circumscribing an axially forward edge of said outer ring, said flange being attached to a nacelle bulkhead for supporting said outer ring, wherein a first portion of said honeycomb structure of said liner has a relatively high density for enhancing a structural rigidity of said blade containment structure, said first portion being located radially inward of and axially aligned with said flange.

9. The blade containment structure of claim 8 and including a second radially outward extending flange coupled to an axially aft edge of said outer ring, said second flange being coupled to the fan casing, wherein a second portion of said honeycomb structure of said liner has a relatively high density for enhancing a structural rigidity of said blade containment structure, said second portion being proximate said second flange.

10. A blade containment structure for capturing blade fragments ejected from a rotating fan blade assembly in a gas turbine engine, the engine having a nacelle with an inlet for directing air into the fan blade assembly, the blade containment structure comprising:

an outer ring encircling the engine axially forward of the fan blade assembly and axially aft of an engine inlet lip;

wherein the engine includes a fan casing coupled to the nacelle and circumscribing the fan blade assembly, said outer ring being coupled between the engine inlet lip and an axially forward edge of the fan casing;

said blade containment structure further comprising a noise absorption liner coupled to an inner surface of said outer ring and a plurality of circumferentially spaced stiffeners integrally formed in said outer ring;

wherein said stiffeners extend angularly with respect to an axially extending line on said outer ring.

* * * * *